US010135728B2

(12) United States Patent
Neychev et al.

(10) Patent No.: US 10,135,728 B2
(45) Date of Patent: Nov. 20, 2018

(54) PARTIAL SWITCHING OF NETWORK TRAFFIC (71) Applicant: SAP SE, Walldorf (DE)

(72) Inventors: Nikolay Veselinov Neychev, Sofia (BG); Bisser Jivkov Paskalev, Sofia (BG)

(73) Assignee: SAP SE, Walldorf (DE)

( * ) Notice: Subject to any disclaimer, the term of this patent is extended or adjusted under 35 U.S.C. 154(b) by 75 days.

(21) Appl. No.: 15/404,168

(22) Filed: Jan. 11, 2017

(65) Prior Publication Data

US 2018/0198707 A1 Jul. 12, 2018

(51) Int. Cl.
*H04L 1/00* (2006.01)
*H04L 12/721* (2013.01)
*H04L 29/08* (2006.01)
*H04L 12/26* (2006.01)
*H04L 29/06* (2006.01)

(52) U.S. Cl.
CPC .............. *H04L 45/72* (2013.01); *H04L 43/50* (2013.01); *H04L 67/10* (2013.01); *H04L 67/1095* (2013.01); *H04L 67/303* (2013.01); *H04L 67/42* (2013.01)

(58) Field of Classification Search
CPC ......... H04L 45/72; H04L 43/50; H04L 67/10; H04L 67/303; H04L 67/42
See application file for complete search history.

(56) References Cited

U.S. PATENT DOCUMENTS

| 2013/0262801 | A1* | 10/2013 | Sancheti | G06F 3/065 711/162 |
| 2014/0189432 | A1* | 7/2014 | Gokhale | G06F 17/30289 714/41 |
| 2016/0299936 | A1* | 10/2016 | Chavda | G06F 11/36 |
| 2017/0286236 | A1* | 10/2017 | Protasov | G06F 11/1464 |

OTHER PUBLICATIONS

Wikipedia; Disaster recovery; Accessed on Dec. 23, 2016; Wikipedia, San Francisco, USA; (https://en.wikipedia.org/wiki/Disaster_recovery).

(Continued)

*Primary Examiner* — Abdelnabi O Musa
(74) *Attorney, Agent, or Firm* — Buckley, Maschoff & Talwalkar LLC (57) ABSTRACT

Various embodiments of systems, computer program products, and methods to provide partial network traffic switching are described herein. In an aspect, a request addressed to a computer application is received for routing to a computing environment hosting the application. The computer application is provided simultaneously at a productive computing environment and a backup computing environment. In another aspect, a triggering associated with the application is executed in response to the request to determining whether the request is test request. The request determined as test request is routed for processing by the application provided at the backup computing environment. In yet another aspect, the request is determined as a test request based on a predefined correspondence between the application and a client application sending the request.

17 Claims, 6 Drawing Sheets (56) References Cited

OTHER PUBLICATIONS

Devcentral; Learn F5 Technologies, Get Answers & Share Community Solutions; Accessed on Dec. 23, 2016; DevCentral Webpage; (https://devcentral.f5.com).

TCL Developer Xchange; Tool Command Language; Accessed on Jan. 10, 2017; TCL Developer Xchange Webpage; (http://wvm.tcl.tk/).

Big-IP Global Traffic Manager Datasheet; Scale and Protect DNS Infrastructure and Optimize Global App Delivery; Accessed on Dec. 23, 2016; F5 Networks, Inc., Seattle, WA, USA; (https://www.f5.com/pdf/products/big-ip-global-traffic-manager-ds.pdf).

* cited by examiner

```
when DNS_REQUEST {
    # Log debug to /var/log/ltm? 1=yes, 0=no)
    set ck_debug 1
        if {$ck_debug} {
            log "Client IP: [IP::client_addr]"
        }
        set ADDR_LIST /dr_test_requests_identification          ─405
        set DR_TEST_MEMBER /dr_pool_disabled_members            ─410
        if {[class exists ${ADDR_LIST}]} {
            set app [class match -value [IP::client_addr] equals
                    "${ADDR_LIST}"]
            if {$app ne ""} {
                if {$ck_debug} {
                    log "[IP::client_addr] match"
                }
                if {$app == [DNS::question name]} {
                    if {$ck_debug} {
                        log "WideIP: [LB::server pool]"
                    }
                    if {[class exists ${DR_TEST_MEMBER}]} {
                        set ip [class match -value $app equals
                                "${DR_TEST_MEMBER}"]
                        if {$ip ne ""} {
                            if {$ck_debug} {
                                log "Resolved to: $ip"
                            }
                            host $ip
                        }
                    } elseif {$ck_debug} {
                        log
                            "Datagroup ${DR_TEST_MEMBER} missing"
                    }
                } elseif {$ck_debug} {
                    log "[IP::client_addr] NOT match"
                }
            }
        } elseif {$ck_debug} {
            log "Datagroup ${ADDR_LIST} missing"
        }
}
```

PARTIAL SWITCHING OF NETWORK TRAFFIC

BACKGROUND

In information and communication technology (ICT), disaster recovery and business continuity are as important for cloud-based services, as, for example, data protection. Cloud service providers may simply not be able to attract enterprise customers without robust and reliable solutions to ensure business availability, e.g., in case of landscape wide malfunctioning. One of the challenges in providing disaster recovery services to customers is how to test the operability. The disaster recovery testing scenarios, especially in cloud environments, would normally interrupt productivity, e.g., when the productive environment has to be replaced by the backup environment. Thus, the operability of all customers of a cloud provider, or at least all clients or users of a customer of a cloud provider would be affected.

BRIEF DESCRIPTION OF THE DRAWINGS

The claims set forth the scope with particularity. The embodiments illustrated by way of example and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for partial switching of network traffic are described herein. In the following description, numerous specific details are set forth to provide a thorough understanding of the embodiments. One skilled in the relevant art will recognize, however, that the presented ideas can be practiced without one or more of the specific details, or with other methods, components, materials, etc. In other instances, well-known structures, materials, or operations are not shown or described in detail to avoid obscuring.

Reference throughout this specification to "one embodiment", "this embodiment" and similar phrases, means that a particular feature, structure, or characteristic described in connection with the embodiment is included in at least one embodiment. Thus, the appearances of these phrases in various places throughout this specification are not necessarily all referring to the same embodiment. Furthermore, the particular features, structures, or characteristics may be combined in any suitable manner in one or more embodiments.

Figure 1:
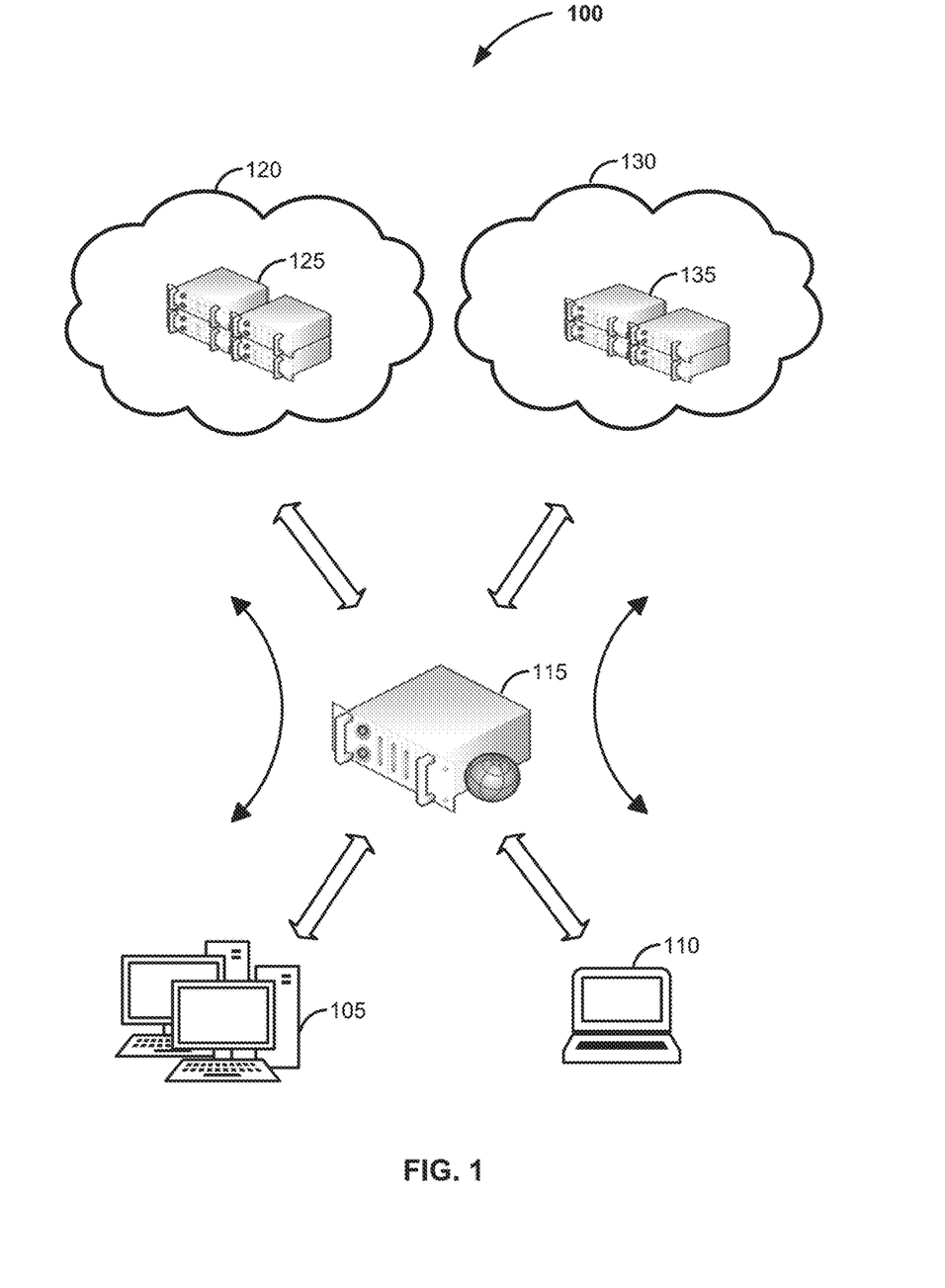
FIG. 1 is a block diagram illustrating a computing landscape for testing disaster recovery services, according to one embodiment.

FIG. 1 illustrates landscape 100 for testing disaster recovery (DR) services for particular client or user, without affecting the operability of other clients or users, according to one embodiment. In a typical scenario, a cloud customer initially registers for a selected set of services. In other words, the customer creates or is associated with an account providing the range of services according to customer's contract. These services can involve infrastructure (e.g., Infrastructure as a Service or IaaS), platform (e.g., Platform as a Service or PaaS), software (e.g., Software as a Service or SaaS), etc. Then, after the initial period of using the cloud-based services, customer upgrades to disaster recoverable account. Thus, customers are usually on-boarded to a disaster recovery (DR) solution for their cloud based services while these services are consumed, e.g., by users and/or clients of the customers. Such on-boarding involves setting up the backup environment (platform, applications, databases, etc.) for a customer corresponding to the setting of the productive environment as previously done for that customer.

In FIG. 1, one or more clients or users 105 of a customer consume services provided by various computer applications or systems 125 at productive cloud environment 120 via the Internet or other network, according to one embodiment. Generally, clients 105 may consume different kinds of cloud-based services. In one embodiment, the requests and data traffic between clients 105 and cloud environment 120 are routed through server 115. Server 115 may be a Data Name System (DNS) global server that identifies the actual network address of the requested cloud-based computing resources (e.g., from systems 125), and directs the traffic accordingly.

In situations where the productive cloud environment becomes inaccessible, the server 115 may direct the traffic to a backup cloud environment 130. Computer systems 135 may mirror the functionality and data of computer systems 125 to provide business continuity for the cloud customers that have subscribed to the DR solution. To ensure that a cloud customer using the DR solution will be able to continue operations during a disaster situation, the cloud provider should test the solution at least during the on-boarding process. However, simulating a disaster situation may disrupt the working process not only for that customer, but also for the other customers of the cloud provider. The test would require switching off the productive cloud environment (e.g., 120) to allow redirecting the traffic (e.g., by the server 115) to the backup cloud environment.

In one embodiment, just the traffic associated with a particular client is redirected to the backup computer environment 130, for testing purposes. For the rest of the clients and the rest of the customers the communication with the productive environment 120 continues as normally. Thus, the testing of DR operability does not disrupt the normal processing, even for the rest of the clients of the customer. In one embodiment, server 115 may be configured to recognize the source (e.g., client 110) of a particular application request or requests, as well as other traffic, and direct such traffic to the backup cloud environment. Thus, the test may be limited not just to a particular client, but also to a particular application or type of traffic.

Figure 2:
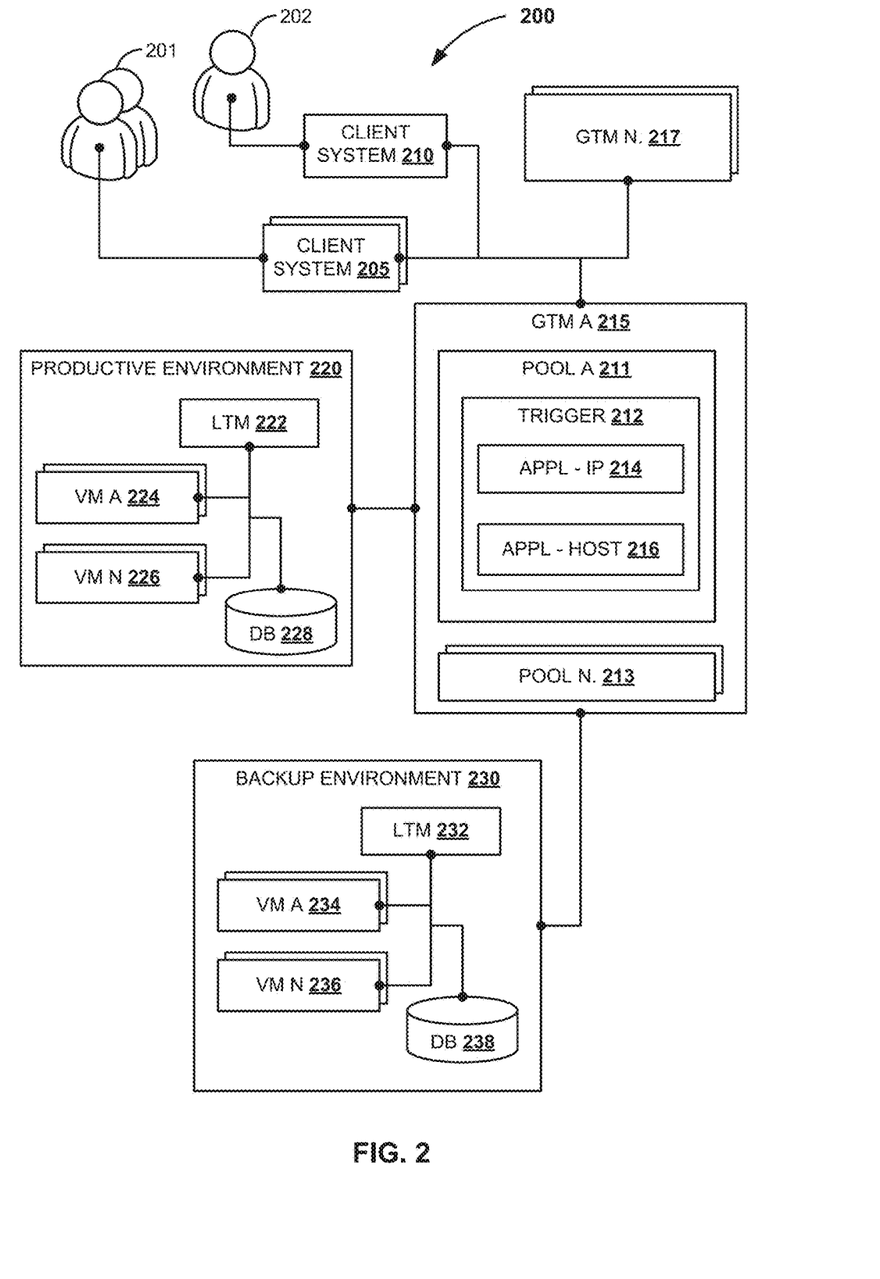
FIG. 2 is a block diagram illustrating a computer landscape for testing disaster recovery services, according to one embodiment.

FIG. 2 illustrates more detailed computing landscape 200 where DR functionality can be tested for selected clients and applications, according to one embodiment. Users 201-202 and client systems 205-210 represent one of more customers of cloud-based services provided at productive site or environment 220. Backup environment 230 is built similar to the production environment 220 to ensure business operations continuity in situations where the production environment 220 is unavailable. Accordingly, backup environment 230 may be synchronized with the production environment 220 to maintain same or similar functionality and data (not illustrated).

In one embodiment, server 215 is configured to redirect specific application requests sent by client system 210 to backup environment 230, while the traffic related to client systems 205 continues to be routed to productive environment 220. Thus, the operability of the DR solution, for example, could be tested without disrupting the normal operations at the productive environment 220. In one embodiment, server 215 is implemented as Global Traffic Manager® (GTM) server originally developed by F5® Networks, Inc. company as part of the BIG-IP® product family. The GTM servers may distribute DNS and user application requests based on business policies, cloud environment conditions, client locations, application performance, etc.

A cloud provided may deploy more than one GTM or other DNS enabled servers, e.g., to handle different types or traffic or traffic at different geographical locations, etc. Thus, GTM server 'A' (215) may route network traffic between clients 205-210 and cloud environments 220 and 230, while GTM servers 'N' 217 may distribute traffic to other computing environments (not illustrated.). For example, server GTM 'A' 215 switches the traffic to backup environment 230 when the productive environment 220 is unavailable. The server GTM 'A' 215 and/or servers GTM 'N' 217 may also switch traffic between more than one productive environments, thus providing load balancing (not illustrated).

Productive environment 220 may include various computer systems to provide a range of cloud-based services depending on customers' needs, according to an embodiment. For example, productive environment 220 includes virtual machines, e.g., at least one virtual machine (VM) 'A' 224, at least one VM 'N' 226, and database (DB) repository 228. In one scenario, a customer may install or enroll a particular application running at VM 'A' 224 and/or VM 'N' 226. One or more users or clients of that customer may generate and send business requests to be handled by the application. For example, the application could be a Human Resource Management (HRM) business application run by a customer of the cloud provider, and users can be employees of different companies that have subscribed as clients to the customer or the vendor of the application. A local server, e.g., Local Traffic Manager® (LTM) 222, within the productive environment 220, can handle the traffic between different applications or different installations of applications. The LTM 222 could distribute the traffic based on different criteria, such as availability, delays, load, security threats, etc.

In one embodiment, backup environment 230 is setup to provide at least partially the range of services provided at the productive environment 220. In other words, the services provided to the customers who are on-boarded for the DR solution, including the relevant business data, are available at the backup environment 220, e.g., via VMs 'A' (234), 'N' (236) and/or DB repository (238). Similarly, the local traffic at the backup environment 230 could be managed and balanced by LTM 232. When productive environment 220 is not available, the on-boarded customers and their respective clients can continue operations at the backup environment 230, according to the implemented DR solution.

In one embodiment, the GTM 'A' 215 is configured to identify client requests sent to a particular application or host (e.g., an application running on one or more of the VMs 'A' 224 and 'N' 226 at productive environment 220, and respectively, one or more of the VMs 'A' 234 and 'N' 236 at backup environment 230). In one embodiment, at GTM 'A' 215, one or more pools may be created or generated to correspond to one or more applications to be consumed or accessed by cloud clients. For example, pool 'A' 211 may correspond to a particular application, e.g., application 'A'. Accordingly, pool 'N' 213 may correspond to another application, and so on. On the other hand, the applications corresponding to pools in GTM 'A' 215, could be available at one or more hosts, e.g., at one or more environments, such as productive environment 220 and backup environment 230. The GTM 'A' 215 may route network traffic, e.g., application requests, to different hosts based on availability and other criteria, such load, suspicious behavior, etc.

In one embodiment, a trigger may be associated with a pool at the GTM 'A' 215. The trigger may be activated when a client request to the application corresponding to the pool is received at the GTM 'A' 215. For example, trigger 212 is associated with pool 'A' 211. When a client request to application 'A' (e.g., corresponding to pool 'A') is received at GTM 'A' 215, trigger 212 is activated and a number of activities can be executed, such as checks, modifications, analyses, etc., including redirecting the corresponding network traffic. In one embodiment, when trigger 'A' is activated, the source of the request may be identified. This identification may involve identifying the Internet Protocol (IP) address of the client system sending the request.

In one embodiment, requests to a particular application can be directed to different computing (cloud) environments for processing, depending on the source of the requests. For example, when the IP address of a client system sending a request or other network traffic to an application (e.g., application 'A') is identified, the trigger (e.g., 212) assigned to the corresponding pool (e.g., 211) at the traffic manager (e.g., 215) may run an algorithm. This algorithm may lookup the IP address in a predefined data structure (e.g., 214) where correspondence between the application and the source computing system may be specified (e.g., 'application-IP' correspondence). If such correspondence is predefined, this could indicate a test request. In other words, requests to a particular application (or other relevant network traffic to the application) sent from a particular client device or computer system could be identified as test requests (traffic).

Another check associated with the trigger (e.g., 212) could be regarding the destination of the requests, e.g., which host or environment the application requests should be routed to. For example, an additional data structure 216 associated with the trigger 212 can be maintained at the GTM 'A' 215 to list the enabled and/or disabled environments or hosts for the requests to application 'A' (e.g., 'application-host' correspondence). In one embodiment, when the trigger 212 identifies an application request as a regular request, GTM 'A' 215 may route the request to a host currently enabled for that application (e.g., the productive environment 220). Accordingly, when an application request is identified as a test request (e.g., by the algorithm associated with the trigger 212), could be routed to a host currently configured as disabled at the GTM 'A' 215 (e.g., the backup environment 230).

In such a manner, the operability of a DR cloud site (e.g., backup computing environment 230) can be tested only for a particular user (e.g., client system 210) accessing a particular application (e.g., application 'A'). In one embodiment, the correspondence between the application, the IP address and host can be stored in different manner, e.g., lists, hash tables, a single data structure, one or more objects, etc. For example, only a correspondence between the IP address (e.g., of client system 210) and the backup computing environment (230) could be stored.

In one embodiment, the trigger 212 and the data structures 214 and 216 at GTM 'A' server 215 could be implemented as BIG-IP iRules® and Data-Groups, respectively. iRules is a highly customized, "Tcl"-based scripting language allowing programmatic access to application traffic in real time. iRules enables inspection, analysis, modification, routing, re-directing, discarding, or manipulating traffic passed through a GTM or art LTM. iRules also provide means to implement business logic at network layer. A Data Group is a particular type of memory structure within iRules, such as hash tables. Data Groups may be dynamic configurations that could be applied to manipulate GTM server configuration. It is effectively a list in a 'key→value' pair format consisting of IP addresses/subnets, strings, or integers. This structure enables having a list of keys, or a list of matched keys and values. A Data Group can be stored permanently as part of the GTM configuration, rather than just existing as a part of iRules or in volatile memory. For example, 'application-IP' correspondence data structure 214 could be one Data Group (hash table) with an entry to map application and IP.

Figure 3:
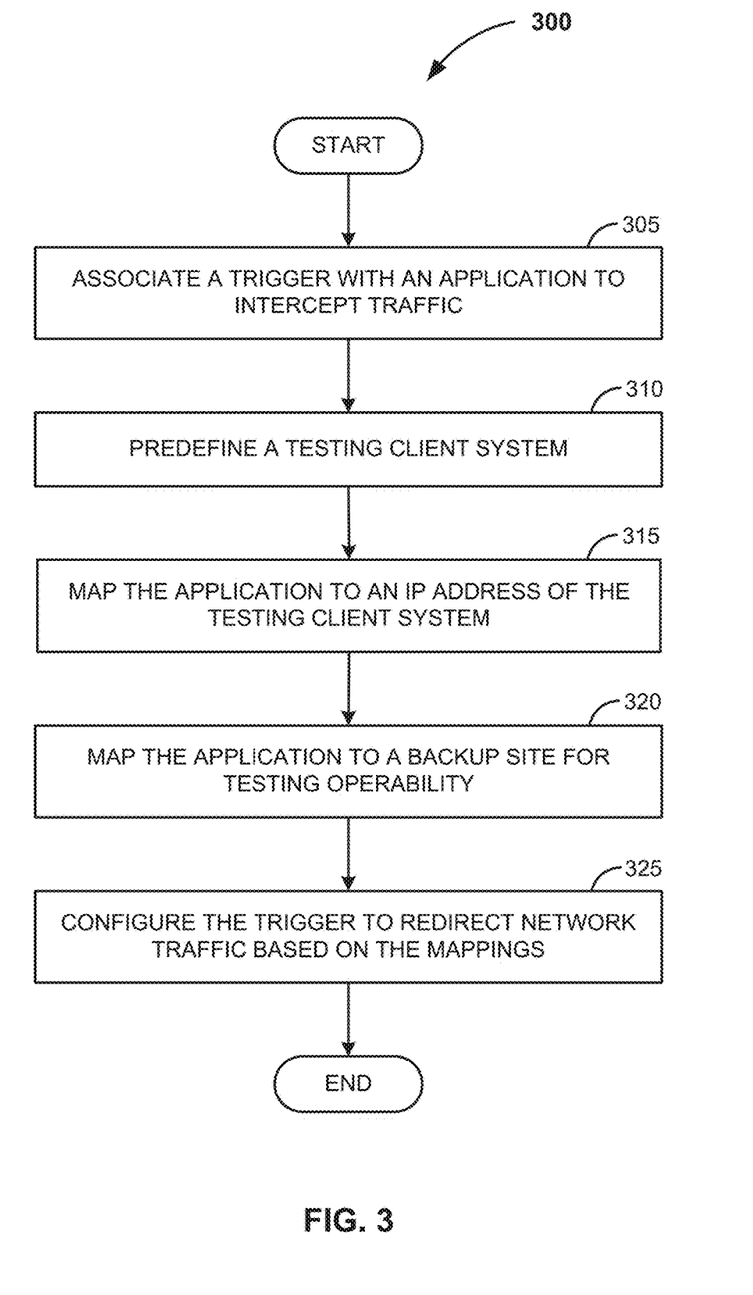
FIG. 3 is a flow diagram illustrating a process to configure partial traffic switching, according to one embodiment.

FIG. 3 illustrates process 300 to configure partial traffic switching. Such partial traffic switching could be used for testing the operability of a DR cloud solution for a particular cloud client. The traffic switching and the corresponding configuration are performed at global network traffic management level, according to one embodiment. For example, one or more global DNS servers such as F5 BIG-IP GTM devices could be configured, accordingly.

At 305, a trigger is associated with an application to intercept traffic related with the application. For example, the trigger may be invoked when an application request directed to the application is received at a DNS server. The network traffic routed by the DNS server could be pooled or handled according to the services or applications associated with the traffic. In a pool there may be one or more members (e.g., host 1, host 2, etc.) that correspond to the different environments (e.g., productive, backup, etc.). These hosts could be enabled or disabled, respectively. There should be only one enabled host, to serve the productive application requests. Accordingly, the pooled application requests are directed to the enabled member of the pool (host). The trigger is associated with the pool (the application). As described with respect to FIG. 2, at GMT 'A' 215, trigger 212 can be generated or assigned to pool 'A' 211 corresponding to application 'A'.

At 310, a testing client system is identified or pointed out, and predefined in the traffic switch configuration. For example, an administrator or other operator of the network traffic management systems may specify an IP address of a client system to send test application requests. The IP address of the client system may be provided by a client or customer. Further, the application is mapped to the provided client system IP address (at 315) and to a backup site or environment (e.g., disabled member/host) for testing its operability (at 320).

Referring again to FIG. 2, the GMT 'A' 215 server could be configured by mapping the application and the provided client system IP address in the application-IP data structure 214. Similarly, as part of the configuration, the application and the backup environment (230) are mapped in the application-host data structure 216. The correspondence between the application, the predefined client system IP address and the backup host can be configured using other means or different arrangement of data structures.

Process 300 as illustrated in FIG. 3 continues at 325 with configuring the trigger to redirect the application related network traffic from the client system to the application at the backup host, based on the mapping (315 and 320). In one embodiment, traffic related with the application with different source would continue to be routed to the productive environment.

Figure 4:
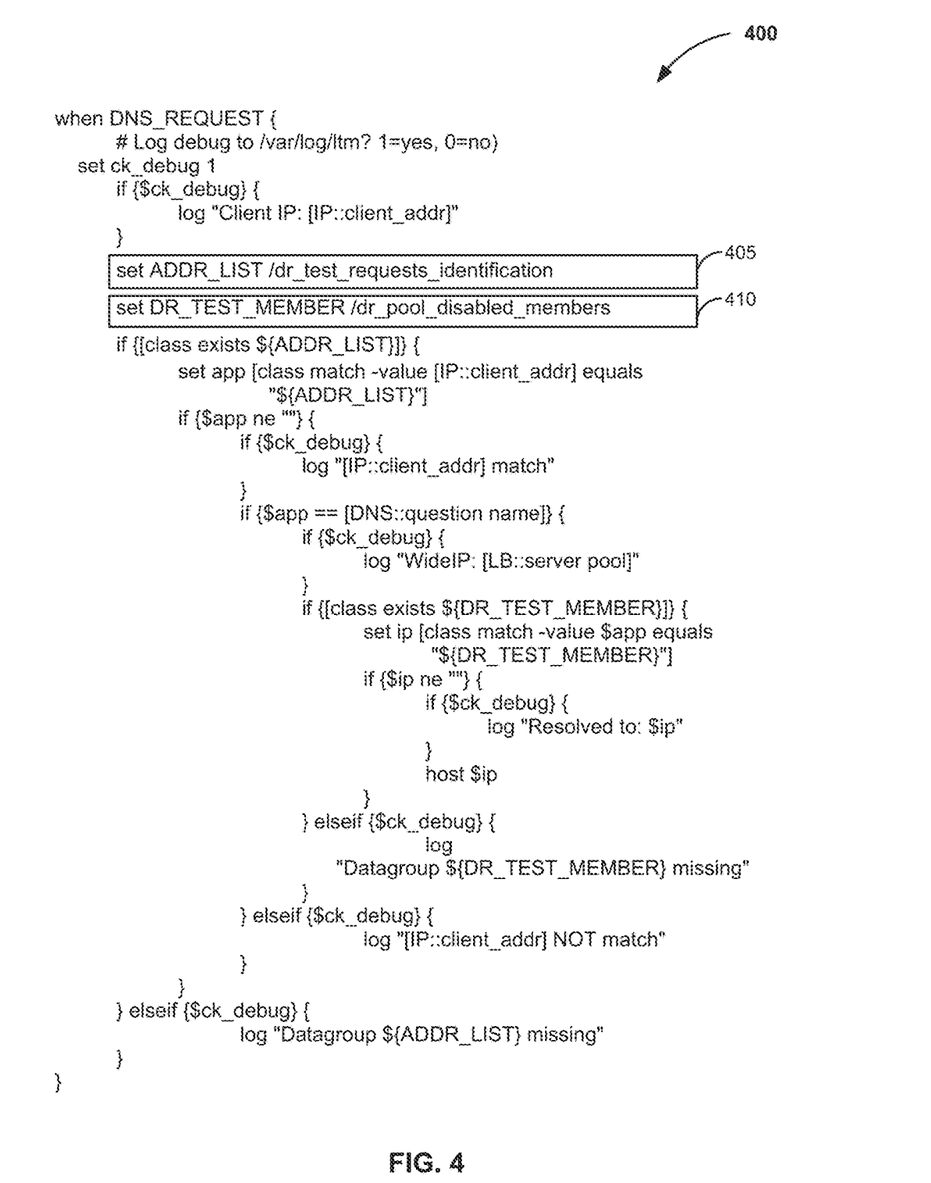
FIG. 4 illustrates an example script corresponding to a trigger to switch network traffic, according to one embodiment.

FIG. 4 illustrates example "Tlc" based script 400 corresponding to an iRule based trigger to switch traffic, according to one embodiment. The script 400 relies on two Data Groups, "ADDR_LIST" and "DR_TEST_MEMBER", accordingly (e.g., lines 405 and 410). In one embodiment, these Data Groups may correspond to the data structures 214 and 216 described in the context of FIG. 2. Thus, "ADDR_LIST" may be referred to as a test request table, specifying the application-IP address mapping, indicating a test application request. Respectively, "DR_TEST_MEMBER" may be referred to as a list of disabled members table, specifying the application-host member mapping, indicating the inactive or backup (DR) environment to where to route the test requests.

Figure 5:
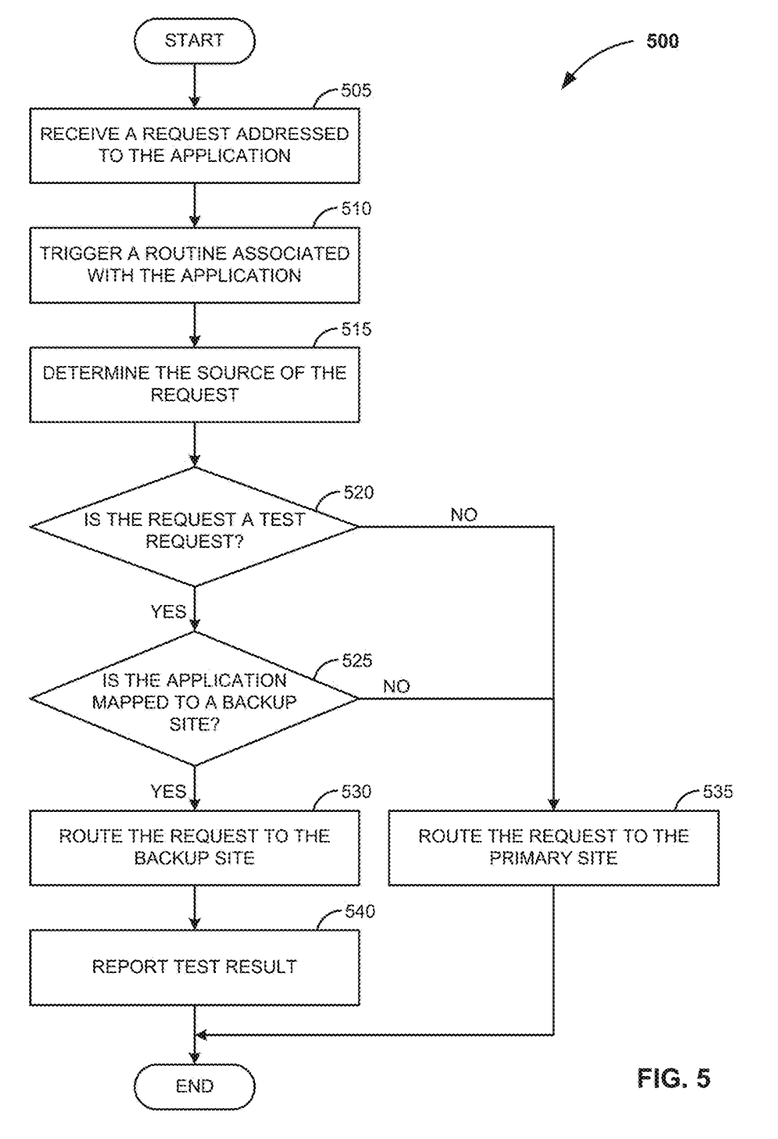
FIG. 5 is a flow diagram illustrating a process to switch partially network traffic, according to one embodiment.

In one embodiment, the partial traffic switching is illustrated by process 500 as shown in FIG. 5. The process (500) may start with receiving an application request, e.g., at a DNS server, at 505. Normally, the DNS server would resolve the destination of the application request and would route the request to an active computing environment hosting the application. However, when the DNS server is configured to provide partial traffic switching, according to one embodiment, a trigger assigned to the application may be activated and a predefined procedure or routine corresponding to the trigger may be applied (e.g., triggered), at 510.

At 515, a source of the request is identified or determined. In one embodiment, the source is identified by the IP address of the computing device from where the request is sent, e.g., originally generated or transferred. At 520, the trigger or the associated routine may verify whether the received request is a test request. In one embodiment, a predefined mapping or correspondence between the source of the request and the requested application may indicate a test request. Accordingly, the routine may lookup such predefined mapping, e.g., in a data structure.

When the received request is determined to be a test request (e.g., mapping exists), another check may be performed to verity whether a backup environment is predefined or configured as a host of the requested application. More than one computing (e.g., cloud based) environments, based on criteria such as location, disaster recovery, security, load distribution, etc., can host one application. The DNS server may resolve the destination of the request based on such a criteria. Accordingly, at a given time there may be only one computing environment hosting the application that is configured as active at the DNS server. In one embodiment, a predefined mapping between the application and an inactive or backup computing environment may indicate that the tests request for this application should be executed at the backup environment. Thus, at 525, a check is performed whether the application is mapped to (e.g., hosted at) a backup site.

At 530, the request determined as a test request is routed to the backup site mapped to the requested application. In one embodiment, if there is no predefined mapping between the application and the backup host, the request may be treated as a normal business request or may be discarded. Accordingly, the indication that a request is a test request may also depend on whether there is a predefined mapping between the application and the backup computing environment. Therefore, at 535, the request would be routed to the active productive site when the request is not determined as a test request (at 520), or when the requested application is not mapped to a backup site (at 525).

The backup computing environment mirrors the productive computing environment to provide the required functionality for the subscribing customers when the productive environment is not available. Typically, backup computing environments are not utilized for load balancing purposes. Therefore, when a request determined as a test request is executed at the backup computing environment, the result of this execution may be discarded. However, a report indicating the operability of the backup computer environment could be generated, at 540. This report may provide and/or analyze the result of the execution of the request by the application at the backup host. Any resulting data discrepancies between the environments would be fixed, e.g., during the synchronization between the environments.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
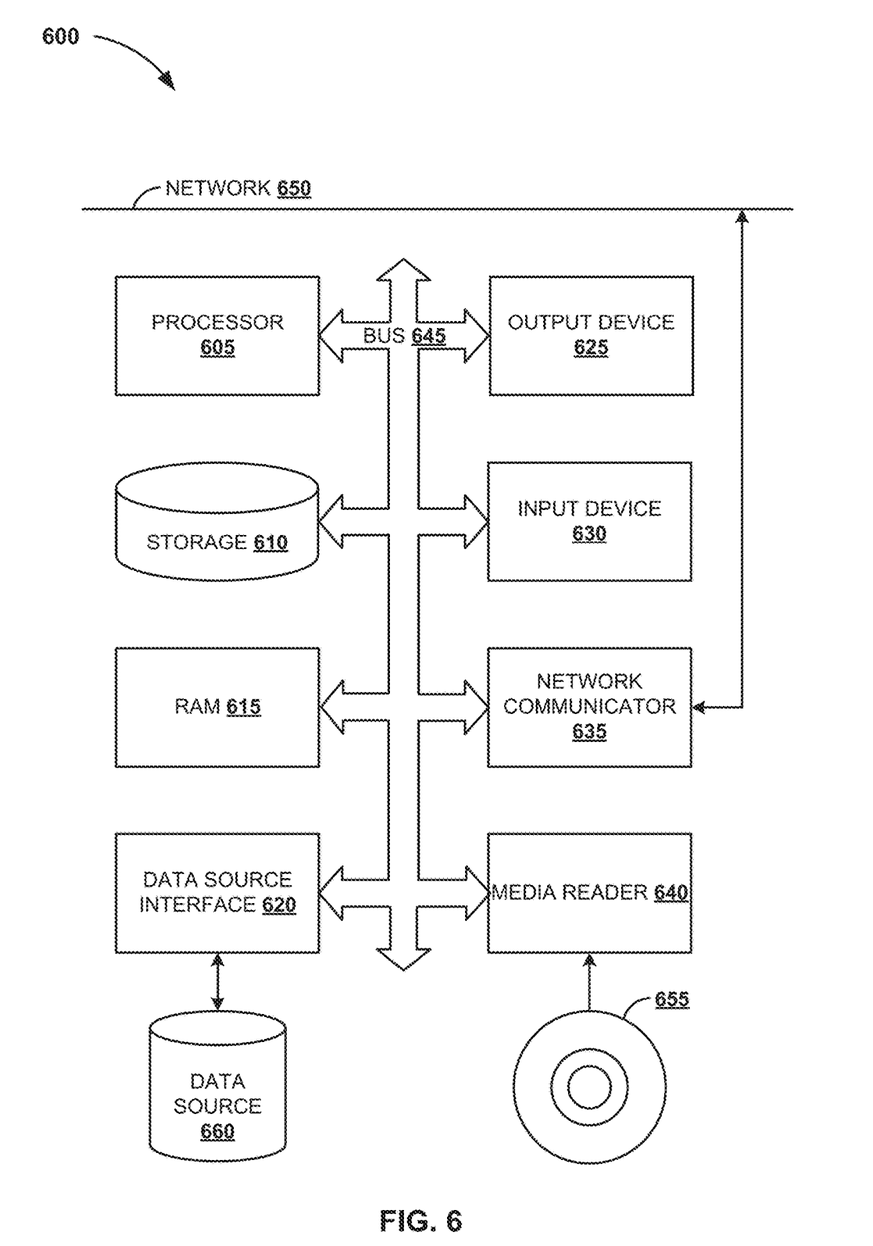
FIG. 6 is a block diagram of an exemplary computer system to execute computer readable instructions, according to one embodiment.

FIG. 6 is a block diagram of an exemplary computer system 600. The computer system 600 includes a processor 605 that executes software instructions or code stored on a computer readable storage medium 655 to perform the above-illustrated methods. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed via network 650. In some embodiments the data source 660 may be accessed by an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the presented embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limiting to the precise forms disclosed. While specific embodiments and examples are described herein for illustrative purposes, various equivalent modifications are possible, as those skilled in the relevant art will recognize. These modifications can be made in light of the above detailed description. Rather, the scope of the specification is to be determined by the following claims, which are to be interpreted in accordance with established doctrines of claim construction.

What is claimed is:

1. A computer system to switch network traffic, comprising:
    at least one operative memory device to store instructions; and
    at least one processor coupled to the at least one operative memory device to execute the instructions to perform operations comprising:
        define a mapping between an application hosted at a cloud computing environment and a client computer system, wherein the cloud computing environment includes a productive computing environment and a backup computing environment;
        generate a trigger associated with the application to be invoked when a request to the application is received;
        identify a source of the request to the application;
        determine whether the request is a test request based on the defined mapping, including comparing the identified source with the client computer system, wherein a match between the client computer system and the identified source indicates a test request;
        when the request is determined to be a test request, search a predefined mapping between the application and the backup computing environment, wherein the predefined mapping between the application and the backup computing environment indicates that the test request is to be executed at the backup computing environment; and
        route the request determined to be a test request to the application hosted at the backup computing environment, when the predefined mapping exists between the application and the backup computing environment, without disrupting operations at the productive computing environment.

2. The system of claim 1, wherein the operations further comprise:
    receive an identification of the client computer system.

3. The system of claim 1, wherein identifying the source of the request further comprises:
    identify an IP address of a client computer system issuing the request.

4. The system of claim 1, wherein determining whether the request is a test request further comprises:
    determine whether the request is a test request based on a mapping between the application and the backup computing environment.

5. The system of claim 1, wherein the operations further comprise:
    define the mapping between the application and the backup computing environment.

6. A non-transitory machine-readable medium to store instructions, which when executed by a computer, cause the computer to perform operations comprising:
    receive a request addressed to a computer application, wherein the computer application is provided simultaneously at a productive computing environment and a backup computing environment; and
    in response to receiving the request, trigger a routine associated with the application, comprising:
        identify a source of the request to the application;
        determine whether the request is a test request, including searching a predefined correspondence between the application and the identified source of the request, wherein the predefined correspondence between the application and the identified source indicates a test request;
        when the request is determined to be a test request, search a predefined correspondence between the application and the backup computing environment, wherein the predefined correspondence between the application and the backup computing environment indicates that the test request is to be executed at the backup computing environment;
        route the request determined to be a test request for processing by the application at the backup computing environment, when the predefined correspondence exists between the application and the backup computing environment, without disrupting operations at the productive computing environment; and
        route the request not determined to be a test request for processing by the application at the productive computing environment.

7. The machine-readable medium of claim 6, wherein triggering the routine associated with the application comprises:
    implement the routine associated with the application, to be invoked when network communication directed to the application is received.

8. The machine-readable medium of claim 6, to store instructions, which when executed by the computer, cause the computer to perform operations further comprising:
    provide at least one predefined correspondence between at least one application and at least one source of corresponding application requests.

9. The machine-readable medium of claim 6, wherein identifying the source of the request further comprises:
    identify an IP address of a client computer system issuing the request.

10. The machine-readable medium of claim 6, wherein the predefined correspondence between the application and the backup computing environment indicates a test request.

11. The machine-readable medium of claim 6, to store instructions, which when executed by the computer, cause the computer to perform operations further comprising:
    provide at least one predefined correspondence between one or more applications and the backup computing environment.

12. A computerized method to switch network traffic, comprising:
    receiving a request addressed to a computer application, wherein the computer application is provided simultaneously at a productive computing environment and a backup computing environment; and
    in response to receiving the request, triggering a routine associated with the application, comprising:

identifying a source of the request to the application;

determining whether the request is a test request, including searching a predefined association between the application and the identified source of the request, wherein the predefined association between the application and the identified source indicates a test request;

when the request is determined to be a test request, searching a predefined association between the application and the backup computing environment, wherein the predefined association between the application and the backup computing environment indicates that the test request is to be executed at the backup computing environment;

routing the request determined to be a test request for processing by the application at the backup computing environment, when the predefined association exists between the application and the backup computing environment, without disrupting operations at the productive computing environment; and routing the request not determined to be a test request for processing by the application at the productive computing environment.

13. The method of claim 12, wherein triggering the routine associated with the application comprises:

implementing the routine associated with the application, to be invoked when network communication directed to the application is received.

14. The method of claim 12, further comprising:

providing at least one predefined association between at least one application and at least one source of corresponding application requests.

15. The method of claim 12, wherein identifying the source of the request further comprises:

identifying an IP address of a client computer system issuing the request.

16. The method of claim 12, wherein the predefined association between the application and the backup computing environment indicates a test request.

17. The method of claim 12, further comprising:

providing at least one predefined association between one or more applications and the backup computing environment.

* * * * *